United States Patent
Gresset et al.

(10) Patent No.: US 8,433,320 B2
(45) Date of Patent: Apr. 30, 2013

(54) METHOD AND A DEVICE FOR DETERMINING A WIRELESS TELECOMMUNICATION DEVICE TO WHICH A HAND-OVER OF A MOBILE TERMINAL HAS TO BE CONDUCTED

(75) Inventors: Nicolas Gresset, Rennes Cedex (FR); Herve Bonneville, Rennes Cedex (FR); Mourad Khanfouci, Rennes Cedex (FR)

(73) Assignee: Mitsubishi Electric Corporation, Tokyo (JP)

( * ) Notice: Subject to any disclaimer, the term of this patent is extended or adjusted under 35 U.S.C. 154(b) by 116 days.

(21) Appl. No.: 12/948,189

(22) Filed: Nov. 17, 2010

(65) Prior Publication Data

US 2011/0117917 A1     May 19, 2011

(30) Foreign Application Priority Data

Nov. 18, 2009   (EP) ................................. 09176346

(51) Int. Cl.
*H04W 36/00*     (2009.01)
(52) U.S. Cl.
USPC ........... 455/436; 455/437; 455/438; 455/422; 455/423
(58) Field of Classification Search ................. 455/436, 455/422, 423, 426, 437, 438
See application file for complete search history.

(56) References Cited

U.S. PATENT DOCUMENTS 6,285,874 B1   9/2001   Magnusson et al.
7,050,803 B2 *   5/2006   Celedon et al. ............... 455/436

OTHER PUBLICATIONS

"PCID confusion", R2-092307, Motorola, XP-002577923, 3GPP TSG-RAN WG2#65bis, Mar. 2009, pp. 1-3.
European Search Report mailed May 21, 2010, in European Patent Application No. 09176346.6, filed Nov. 18, 2009.

\* cited by examiner

*Primary Examiner* — David Q Nguyen
(74) *Attorney, Agent, or Firm* — Oblon, Spivak, McClelland, Maier & Neustadt, L.L.P.

(57) ABSTRACT

The present invention concerns a method for determining a wireless telecommunication device to which a hand-over of a mobile terminal has to be conducted, wherein plural wireless cellular telecommunication devices transfer the same physical cell identity to mobile terminals. The method comprises the steps of:
   receiving at least one measurement report,
   determining, from the received measurement report that a hand-over of the mobile terminal has to be conducted to a wireless telecommunication device which transfers the same physical cell identifier as the one transferred by at least another wireless telecommunication device,
   obtaining a list of wireless telecommunication devices which transfer the same physical cell identifier,
   reducing, using a fingerprint table, the list of wireless telecommunication devices which transfer the same physical cell identifier,
   starting the hand-over of the mobile terminal.

13 Claims, 4 Drawing Sheets

METHOD AND A DEVICE FOR DETERMINING A WIRELESS TELECOMMUNICATION DEVICE TO WHICH A HAND-OVER OF A MOBILE TERMINAL HAS TO BE CONDUCTED

The present invention relates generally to a method and a device for determining, in a wireless cellular telecommunication network, a wireless telecommunication device to which a hand-over of a mobile terminal has to be conducted.

In classic wireless cellular telecommunication networks, each base station has an identifier like a physical cell identity (PCID) for each of its cells or each sector of its cell or cells. The PCID characterises a cell or sector of the base station in the physical layer.

For example, the PCID is associated to two sequences, a first sequence named PSC sequence or Primary Synchronisation Signal (PSS) which is transferred in the Primary Synchronisation Channel (PSC) and a second sequence named SSC sequence or Secondary Synchronisation Signal (SSS) which is transferred in the Secondary Synchronisation Channel (SSC).

Three PSC sequences are available in the wireless cellular telecommunication network, each having good time auto-correlation properties.

In addition to PCID identification, the PSC sequences may be used for rough synchronisation and for channel estimation enabling coherent detection of the SSC sequence. In addition to PCID identification, the SSC sequences may be used for synchronisation refinement.

The three PSC sequences are quasi-orthogonal in order to ensure efficient time synchronisation for three different synchronised cells.

Hundred sixty eight SSC sequences are available in the wireless cellular telecommunication network, each having low cross-correlation with other SSC sequences.

According to the aforementioned example, the total number of PCIDs is then equal to five hundred and four.

In addition to the PCID, the base station broadcasts another identifier named Cell Global Identifier (CGI) which uniquely identifies the cell or sector of the base station among the wireless cellular telecommunication network. The obtaining of a CGI is more complex for a mobile terminal than the PCID as it is transferred as data and requires full synchronisation and decoding.

Indeed, by monitoring the received PCID signals strength from neighbouring base stations at a mobile terminal, the system can decide to hand-over the mobile terminal communication to the best signal strength base station.

Schematically, a mobile terminal reports measures and corresponding PCIDs to its serving base station. The base station decides that it's profitable to proceed to a hand-over of the mobile terminal to a base station identified by a selected PCID. The base station transfers a hand-over request to the target base station. If the hand-over is accepted, resources are allocated at the target base station and the base station asks the mobile terminal to hand-over to the target base station. The mobile terminal attempts to connect to the target base station and the resource is freed at the source base station in case of success. A path switch is made to redirect data intended to the mobile terminal to the target base station.

In a typical macro-cell deployment, the number of PCIDs is sufficiently high to make sure that two neighbour cells of any cell have two different PCIDs. Thus, the source base station can uniquely identify the cell of the target base station with a one-to-one mapping table between the transmitted PCID signal and the cell of the target base station.

Today, wireless cellular telecommunication networks are largely deployed but there are still some areas not covered by the base stations of the wireless cellular telecommunication network.

The access to the wireless cellular telecommunication network might not be possible for a mobile terminal located in a building, if the signals radiated by the base stations are too attenuated.

Solutions are proposed today. Particular wireless telecommunication devices, like home base stations or femto base stations or pico base stations, provide coverage areas at least within the buildings. Relays are also considered.

Due to the constant coverage area size reduction and spectral efficiency increase, the amount of home base stations and/or relays becomes very important and situation may occur wherein the number of PCIDs becomes too small.

In a heterogeneous network comprising a large number of home base stations, a base station may face a situation wherein under its coverage area several home base stations transmit the same PCID. The neighbouring relation table is not anymore a one to one mapping between the PCID and the cell of the target base station or home base station. This situation is called PCID confusion as the source base station cannot uniquely identify, from a PCID, the target cell and consequently cannot uniquely identify the target base station or home base station in a hand-over procedure.

In order to cope with this issue, it was proposed to initiate as many hand-over procedures as the number of potential target cells in the neighbourhood sharing the same PCID. Resources are allocated at each potential target home base station or base station, enabling the mobile terminal to transfer data to the target cell sharing the same PCID. Once data are received from the mobile terminal through one of the potential target cells, the home base station or base station managing the cell through which data are received from the mobile terminal is selected as the home base station or base station to which hand-over has to be conducted. The resources allocated by other home base stations or base stations are released.

Such solution is complex to implement and resources of many home base stations are unnecessarily allocated.

In another solution that was proposed to solve PCID confusion, the base station or home base station requests the mobile terminal to receive and decode the CGI.

This requires additional delay and may decrease hand-over performance.

The present invention aims at providing a solution which enables a more efficient use of the resources in a wireless cellular telecommunication network wherein wireless telecommunication devices like home base stations or relays are deployed.

To that end, the present invention concerns a method for determining, in a wireless cellular telecommunication network, a wireless telecommunication device to which a hand-over of a mobile terminal has to be conducted, wherein plural wireless cellular telecommunication devices transfer the same physical cell identity to mobile terminals, characterised in that the method comprises the steps of:

receiving at least one measurement report on signals measured by a mobile terminal, determining, from the at least one measurement report, that a hand-over of the mobile terminal has to be conducted to a wireless telecommunication device which transfers the same physical cell identifier as the one transferred by at least another wireless telecommunication device, obtaining a list of wireless telecommunication devices which transfer the same physical cell identifier, reducing, using a fingerprint table and the at least one measurement report, the list of wireless telecommunication devices which transfer the same physical cell identifier, starting the hand-over of the mobile terminal to at least one wireless telecommunication device which belongs to the reduced list of wireless telecommunication devices.

The present invention concerns also a device for determining, in a wireless cellular telecommunication network, a target wireless telecommunication device to which a hand-over of a mobile terminal has to be conducted, wherein plural wireless cellular telecommunication devices transfer the same physical cell identity to mobile terminals, characterised in that the device for determining the target wireless telecommunication device comprises:

means for receiving at least one measurement report on signals measured by a mobile terminal, means for determining, from the at least one measurement report that a hand-over of the mobile terminal has to be conducted to a wireless telecommunication device which transfers the same physical cell identifier as the one transferred by at least another wireless telecommunication device, means for obtaining a list of wireless telecommunication devices which transfer the same physical cell identifier, means for reducing, using a fingerprint table and at least one measurement report, the list of wireless telecommunication devices which transfer the same physical cell identifier, means for starting the hand-over of the mobile terminal to at least one wireless telecommunication device which belongs to the reduced list of wireless telecommunication devices.

According to a particular feature, one fingerprint is a list of physical cell identifiers obtained from the at least one measurement report ordered or not according to the power strength of signals reported in the at least one measurement report or is a part of a set of physical cell identifiers obtained from the at least one measurement report.

Thus, the fingerprint can be obtained without mechanisms other than the measurements usually reported by terminals.

According to a particular feature, the fingerprint is a combination of physical cell identifiers and associated data on which margin coefficients are applied.

Thus, the fingerprint comparison is flexible and can adapt to variations of radio parameters.

According to a particular feature, at least one fingerprint is associated to one wireless telecommunication device.

Thus, the fingerprint table can be used accurately when terminals approach a cell of a wireless communication device from different locations.

According to a particular feature, fingerprints are re-evaluated at the time of reducing the list of wireless telecommunication devices by taking into account updated information about wireless devices included in the fingerprints.

Thus, the fingerprint can be dynamically adapted to transmit power variations and neighbouring topology modifications.

According to a particular feature, the method further comprises the step of updating the fingerprint table depending on the result of the hand-over.

Thus, the fingerprint table is dynamically built without the need of configuration and follows the dynamics of the cellular wireless telecommunication network.

According to a particular feature, a likelihood value is associated with each fingerprint in the fingerprint table, if the hand-over to one wireless telecommunication device is unsuccessful, the method comprises further step of decreasing the reliability value of the likelihood value associated to the fingerprint associated to the wireless telecommunication device and if the hand-over to one wireless telecommunication device is successful, the method comprises further step of increasing the reliability value of the likelihood value associated to the fingerprint associated to the wireless telecommunication device.

Thus, the fingerprint table smoothly adapts to neighbourhood modifications based on hand-over statistics.

According to a particular feature, each physical cell identifier in one fingerprint is associated with a weight depending on the type of wireless telecommunication device.

Thus, the fingerprint combines the stability provided by references such as base stations and precision given by smaller cells of wireless communication devices references.

According to a particular feature, the device for determining the target wireless telecommunication device is included in a base station or an access gateway of the wireless cellular telecommunication network.

According to still another aspect, the present invention concerns a computer program which can be directly loadable into a programmable device, comprising instructions or portions of code for implementing the steps of the method according to the invention, when said computer program is executed on a programmable device.

Since the features and advantages relating to the computer program are the same as those set out above related to the method and apparatus according to the invention, they will not be repeated here.

The characteristics of the invention will emerge more clearly from a reading of the following description of an example of embodiment, the said description being produced with reference to the accompanying drawings, among which.

Figure 1:
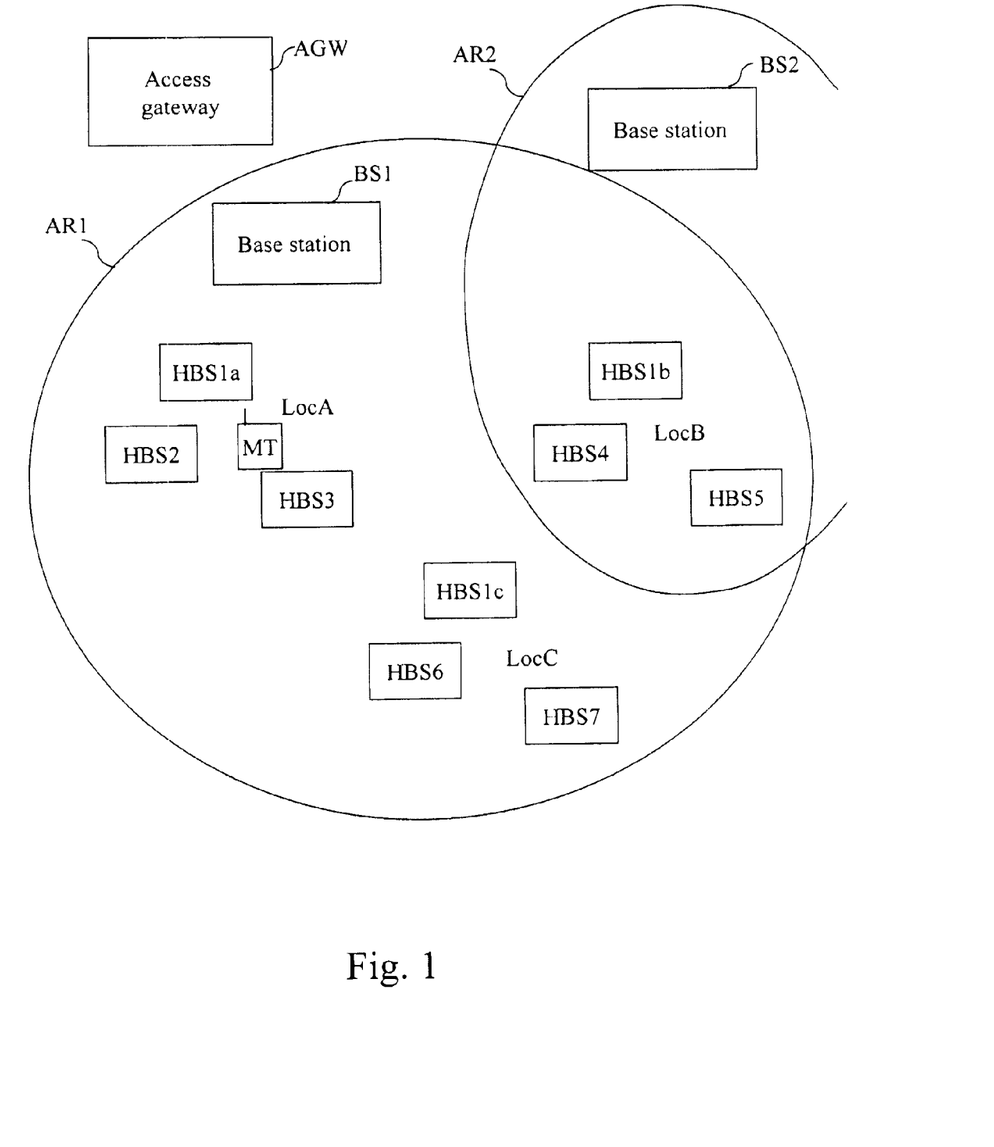
FIG. 1 represents a wireless cellular telecommunication network in which the present invention is implemented.

In FIG. 1, two base stations BS1 and BS2 and nine wireless telecommunication devices HBS1a, HBS1b, HBS1c, HBS2 to HBS7 of a wireless cellular telecommunication network are shown.

Two base stations BS1 and BS2 and nine wireless telecommunication devices HBS1a, HBS1b, HBS1c, HBS2 to HBS7 are shown but we can understand that the present invention works when a different, e.g., more important, number of base stations and/or wireless telecommunication devices exist in the wireless cellular telecommunication network.

The wireless telecommunication devices HBS are for example located at home.

The wireless telecommunication devices HBS may be for example home base stations or relays or a combination of relays and home base stations.

Each home base station is like a base station with a cell coverage limited to few hundreds square meters and which may enable a reduced number of mobile terminals to access the wireless cellular telecommunication network.

Each relay may enable mobile terminals associated to the relay to access the wireless cellular telecommunication network. For example, relays transmit signals through a downlink channel to mobile terminals and receive signals from mobile terminals through an uplink channel as if they were classic base stations or home base stations. However, unlike a base station or a home base station which has a wired connection to a telecommunication network, the relay has only a wireless connection with a base station or a home base station and its connection to the telecommunication network is made via the base station or the home base station.

The wireless telecommunication devices HBS are able to receive signals transferred by mobile terminals which are located in the cell, not shown in FIG. 1, they respectively manage. The wireless telecommunication devices HBS transfer signals which can be received and processed by mobile terminals located in the cell they respectively manage.

The wireless telecommunication devices HBS1*a*, HBS1*b*, HBS1*c*, HBS2, HBS3, HBS4, HBS5, HBS6 and HBS7 are located in the cell AR1 managed by the base station BS1.

For the sake of simplicity, the present invention will be described in an example where each base station BS or each wireless telecommunication device HBS manage a single cell. The present invention is also applicable when at least one wireless telecommunication device manages more than one cell.

The wireless telecommunication devices HBS1*b*, HBS4 and HBS5 are located in the cell AR2 managed by the base station BS2.

An access gateway AGW may be included in the wireless cellular telecommunication network.

The access gateway AGW may interface the wireless telecommunication devices HBS with the remaining devices of the wireless cellular telecommunication network.

The access gateway AGW may determine with which wireless telecommunication device HBS located in the cell of base station BS1 or BS2 a hand-over has to be performed.

In the present invention, plural wireless telecommunication devices HBS may share the same PCID which identifies their respective cell.

For example, the wireless telecommunication devices HBS1*a*, HBS and HBS1*c* share the same PCID which identifies their respective cell.

For example, each wireless telecommunication device HBS2 to HBS7 transfers to mobile terminals a PCID identifying their cell which is different from the PCID identifying their cell transferred by the other wireless telecommunication devices.

According to a particular mode of realisation of the present invention, at least a part of the wireless telecommunication devices HBS transfers at least two physical cell identities. More particularly, only one of the physical cell identity is used to characterise a code for scrambling data exchanged with mobile terminals and intends to identify the cell of wireless telecommunication device HBS which transfers the physical cell identity among neighbouring wireless telecommunication devices HBS or base stations BS. The other PCID (s) is or are transferred in order to bring diversity and refine wireless telecommunication device HBS identification.

The base stations BS1 and BS2 and the access gateway AGW are linked together by a communication network not shown in FIG. 1.

The wireless telecommunication devices HBS1*a*, HBS1*b*, HBS1*c*, HBS2 to HBS7, may be linked by the communication network if the wireless telecommunication devices are home base stations.

The communication network is for example, a PSTN network (Public Switch Telecommunication Network) or a packet switched network like an ISDN (Integrated Services Digital Network) network, etc.

According to the invention, at least one base station BS or at least one wireless communication device HBS or the access gateway AGW:

receives at least one measurement report on signals measured by a mobile terminal, determines, from the at least one measurement report that a hand-over of the mobile terminal has to be conducted to a wireless telecommunication device which transfers the same physical cell identifier as the one transferred by at least another wireless telecommunication device, obtains a list of wireless telecommunication devices which transfer the same physical cell identifier, reduces, using a fingerprint table and the at least one measurement report, the list of wireless telecommunication devices which transfer the same physical cell identifier, starts the hand-over of the mobile terminal to at least one wireless telecommunication device which belongs to the reduced list of wireless telecommunication devices.

Figure 2:
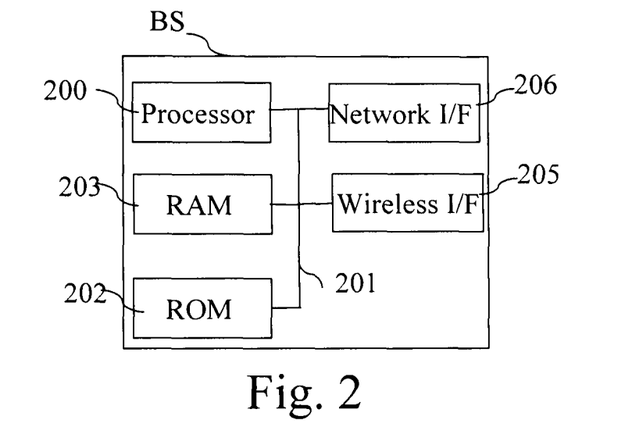
FIG. 2 is a diagram representing the architecture of a base station in which the present invention is implemented.

FIG. 2 is a diagram representing the architecture of a base station in which the present invention is implemented.

Figure 4:
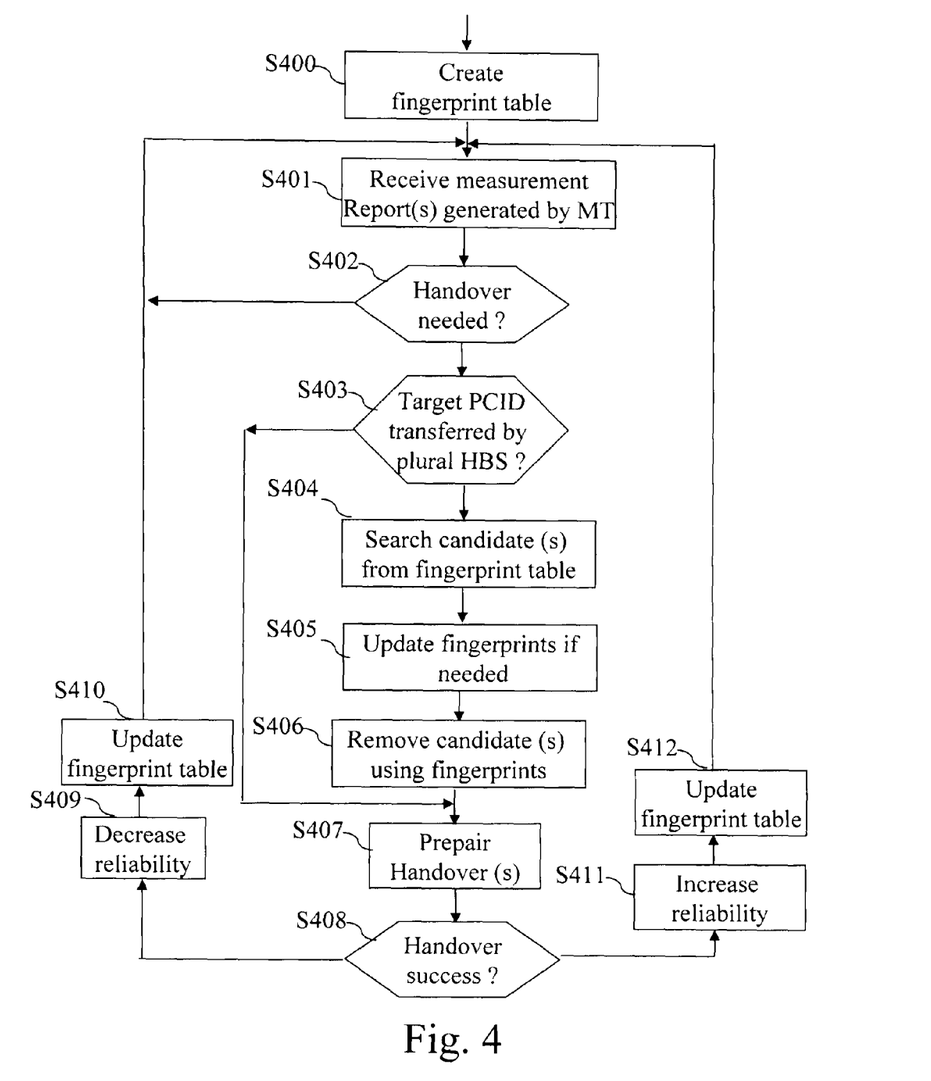
FIG. 4 discloses an example of an algorithm executed by a wireless telecommunication device or an access gateway according to a first mode of realisation of the present invention.
Figure 5:
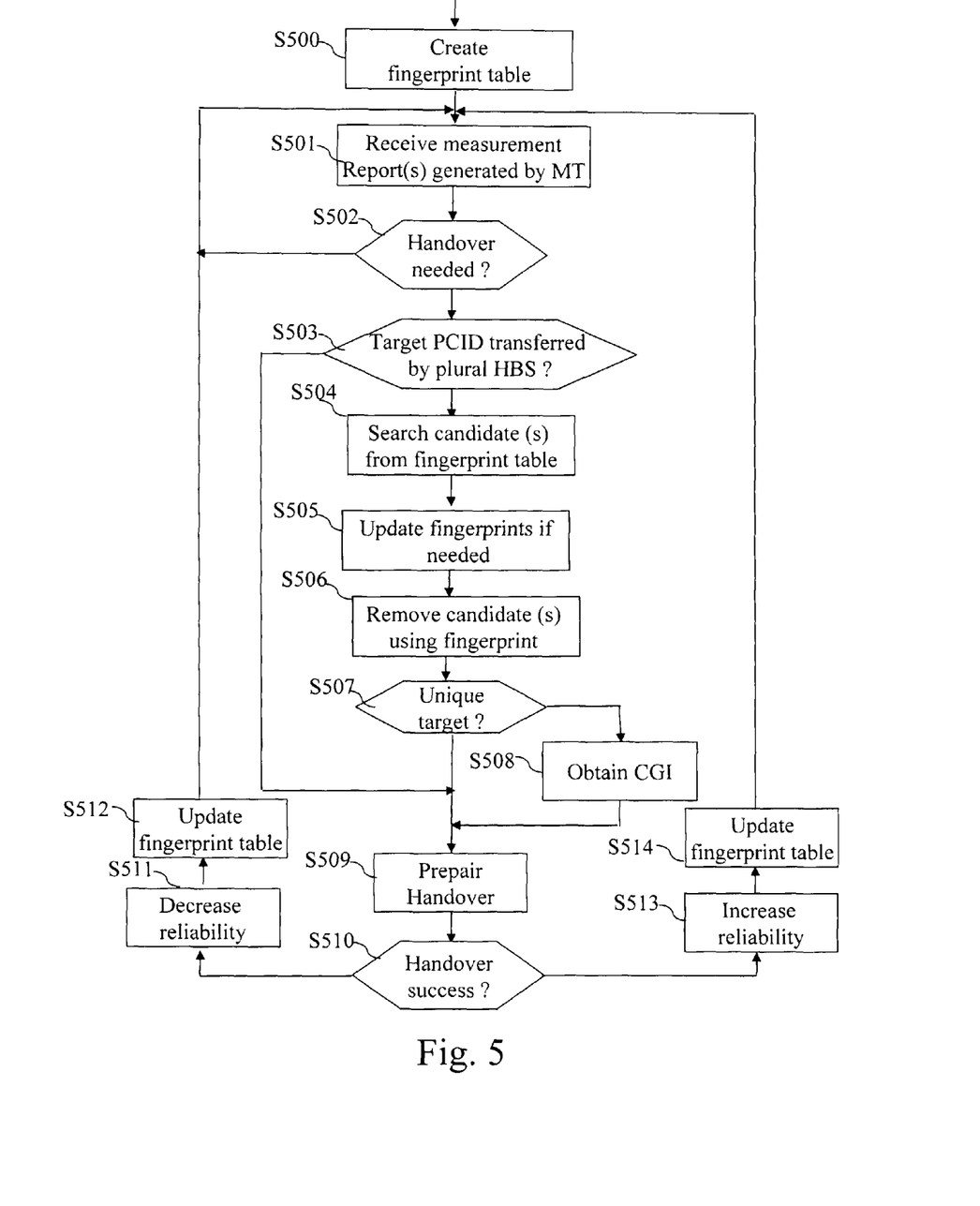
FIG. 5 discloses an example of an algorithm executed by a wireless telecommunication device or an access gateway according to a second mode of realisation of the present invention.

The base station BS has, for example, an architecture based on components connected together by a bus 201 and a processor 200 controlled by the program as disclosed in FIG. 4 or 5.

It has to be noted here that, instead of being based on a processor, the architecture of the base station BS may be based on dedicated integrated circuits.

The bus 201 links the processor 200 to a read only memory ROM 202, a random access memory RAM 203, a wireless interface 205 and a network interface 206.

The memory 203 contains registers intended to receive variables and the instructions of the program related to the algorithm as disclosed in FIG. 4 or 5.

The processor 200 controls the operation of the network interface 206 and of the wireless interface 205.

The read only memory 202 contains instructions of the program related to the algorithms as disclosed in FIG. 4 or 5, which are transferred, when the base station BS is powered on, to the random access memory 203.

The base station BS may be connected to a telecommunication network through the network interface 206. For example, the network interface 206 is a DSL (Digital Subscriber Line) modem, or an ISDN (Integrated Services Digital Network) interface, etc.

Through the network interface 206, the base station BS may transfer messages to other base stations BS or to wireless telecommunication devices HBS or to the access gateway or to core devices of the wireless cellular telecommunication network.

The wireless interface 205 and the network interface 206 are the resources of the base station BS that may be used by a mobile terminal in order to access the wireless cellular telecommunication network when the mobile terminal is served by the base station BS, i.e. establishes or receives or continue a communication with a remote telecommunication device.

The wireless interface 205 comprises a downlink transmission module and an uplink reception module.

It has to be noted that the wireless telecommunication devices have a similar architecture as the one disclosed in FIG. 2.

Figure 3:
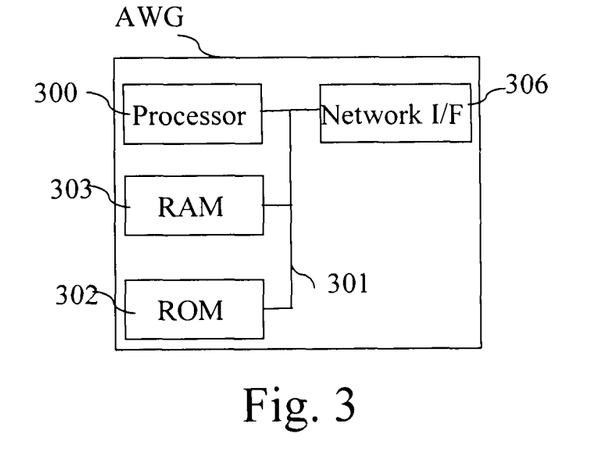
FIG. 3 is a diagram representing the architecture of an access gateway in which the present invention is implemented.

FIG. 3 is a diagram representing the architecture of an access gateway in which the present invention is implemented.

The access gateway AGW has, for example, an architecture based on components connected together by a bus 301 and a processor 300 controlled by the program as disclosed in FIG. 4 or 5.

It has to be noted here that, instead of being based on a processor, the architecture of the coordinator may be based on dedicated integrated circuits.

The bus 301 links the processor 300 to a read only memory ROM 302, a random access memory RAM 303 and a network interface 306.

The memory 303 contains registers intended to receive variables and the instructions of the program related to the algorithm as disclosed in FIG. 4 or 5.

The processor 300 controls the operation of the network interface 306.

The read only memory 302 contains instructions of the program related to the algorithm as disclosed in FIG. 4 or 5, which are transferred, when the access gateway AGW is powered on, to the random access memory RAM 303.

The access gateway AGW is connected to a telecommunication network through the network interface 306. For example, the network interface 306 is a DSL modem, or an ISDN interface, etc.

Through the network interface 306, the access gateway AGW may transfer messages to wireless telecommunication devices or to base stations BS of the wireless cellular telecommunication network or to core network devices of the wireless cellular telecommunication network not shown in FIG. 1.

FIG. 4 discloses an example of an algorithm executed by a wireless telecommunication device or an access gateway according to a first mode of realisation of the present invention.

For example, the present algorithm will be disclosed when it is executed by the processor 200 of the base station BS1 which is currently serving the mobile terminal MT.

A mobile terminal MT is served by a base station BS when it can establish or continue a communication with a remote communication device through the resources of the base station BS.

At step S400, the processor 200 creates a fingerprint table in the RAM memory 203 for wireless telecommunication devices HBS1a, HBS1b and HBS1c.

For example, a fingerprint comprises a list of PCIDs.

For example, the fingerprint for the wireless telecommunication device HBS1a corresponds to the location noted LocA in FIG. 1 and comprises the PCID identifying the cell of the base station BS1 which is transferred by the base station BS1 and noted PCIDB1, the PCID identifying the cell of the wireless telecommunication device HBS1a which is transferred by the wireless telecommunication device HBS1a and noted PCID1, the PCID identifying the cell of the wireless telecommunication device HBS2 which is transferred by the wireless telecommunication device HBS2 and noted PCID2 and the PCID identifying the cell of the wireless telecommunication device HBS3 which is transferred by the wireless telecommunication device HBS3 and noted PCID3.

For example, the fingerprint for the wireless telecommunication device HBS1b corresponds to the location noted LocB in FIG. 1 and comprises the PCID identifying the cell of the base station BS1 which is transferred by the base station BS1 and noted PCIDB1, the PCID identifying the cell of the base station BS2 which is transferred by the base station BS2 and noted PCIDB2, the PCID identifying the cell of the wireless telecommunication device HBS1b which is transferred by the wireless telecommunication device HBS1b and noted PCID1, the PCID identifying the cell of the wireless telecommunication device HBS4 which is transferred by the wireless telecommunication device HBS4 and noted PCID4 and a first and second PCIDs noted PCID5 and PCID5' transferred by the wireless telecommunication device HBS5. One of the PCID, for example PCID5, identifies the cell of the wireless telecommunication device HBS5 and is used to characterise the code for scrambling data exchanged with mobile terminals, the other being transferred only for the purpose of bringing diversity in the measurements for the fingerprint.

According to particular mode of realisation of the present invention, a base station BS or a wireless telecommunication device BS may transfer plural PCIDs in parallel for a given cell in order to increase the diversity of the fingerprint.

For example, the fingerprint for the wireless telecommunication device HBS1c corresponds to the location noted LocC in FIG. 1 and comprises the PCID identifying the cell of the base station BS1 which is transferred by the base station BS1 and noted PCIDB1, the PCID identifying the cell of the wireless telecommunication device HBS1c which is transferred by the wireless telecommunication device HBS1c and noted PCID1, the PCID identifying the cell of the wireless telecommunication device HBS6 which is transferred by the wireless telecommunication device HBS6 and noted PCID6 and the PCID identifying the cell of the wireless telecommunication device HBS7 which is transferred by the wireless telecommunication device HBS7 and noted PCID7.

The order of the PCID comprised in each fingerprint may or not be representative of the order, in term of received power strength of signals corresponding to the PCID.

The fingerprint table comprises the fingerprints of LocA, LocB and LocC. Each fingerprint is determined according to a plurality of measurement reports. A finger print may be a concatenation of plural measurements reports which have been transferred by base stations BS and/or wireless telecommunication devices HBS and/or mobile terminals.

For example, each fingerprint may comprise a set of PCIDs observed by a mobile terminal, or the N PCIDs received with the strongest power, N being a predetermined integer.

For example, each fingerprint may comprise a set of PCIDs received with a power over a given threshold, or a set of received PCIDs along with its received signal strength.

For example, each fingerprint may comprise a set of PCIDs along with a time synchronisation difference relative to signals coming from the serving base station, the SINR, a path loss and interference profile and/or a geo location information.

For example, each fingerprint may be an equation based on a set of PCIDs. For example, the fingerprint for HBS1b can be PCIDB1 AND PCIDB2 AND PCID1 AND (PCID4 OR (PCID5 AND PCID5')). That example takes into account the fact that one wireless telecommunication device HBS4 or HBS5 may be recently installed or powered on or off. If at time of transfer of the measurement report, the wireless telecommunication device HBS4 or HBS5 is powered off, it is still possible to find a fingerprint which corresponds to the measurement report.

Each fingerprint may comprise for each PCID data associated to the PCID. Data are for example the received signal strength, SINR, with margin coefficients to be applied on data.

For example, each PCID may be associated with data relative to the wireless communication device obtained by a communication channel different than the measurement report transferred by mobile terminals, for example the transmitted power used by the wireless communication device which transfers the PCID in its cell.

Each PCID may be associated with a weight depending on the type of wireless communication device. For example, the weight associated to PCIDB2 may be greater than the weight associated to PCID2 as signals coming from base station BS2 may be more reliable than signals coming from home base station HBS2.

Each fingerprint may be representative of the situation observed by mobile terminals the last time a successful hand-over occurred from the source base station to a particular target cell.

Each fingerprint may be associated with a likelihood value, obtained for example from hand-over success rate.

It has to be noted here that one wireless telecommunication device may have plural fingerprints in the fingerprint table for a particular target cell.

At step S401, the processor 200 detects the reception, through the network interface 206, of at least one measurement report of measures executed by at least one mobile terminal MT and/or by the base station BS1.

When the present algorithm is executed by the access gateway AGW, the at least one measurement report is received from the base station BS which serves the mobile terminal MT.

A measurement report may comprise for example, each received PCID received with a signal power strength over a given threshold, each PCID received by the mobile terminal MT along with its received signal power strength, each of the N PCIDs received by the mobile terminal with the strongest signal power strength.

The at least one measurement report is used as such by the serving base station BS when it executes the present algorithm or is transferred by the serving base station BS to the access gateway AGW or is processed by the serving base station BS and the result of the process is transferred to the access gateway AGW.

According to the example of FIG. 1, as the mobile terminal MT is located in the cell AR1 of the base station BS1 and in the vicinity of the wireless telecommunication devices HBS1a, HBS2 and HBS3, the at least one measurement report comprises the PCID received from the base station BS1 along with its received signal strength, the PCID received from the wireless telecommunication device HBS1a along with its received signal strength, the PCID received from the wireless telecommunication device HBS2 along with its received signal strength and the PCID received from the wireless telecommunication device HBS3 along with its received signal strength.

At step S402, the processor 200 checks if a hand-over has to be performed for the mobile terminal MT.

A hand-over has to be performed when the received signal power strength of the signals transferred by the base station BS1 is below a predetermined threshold and/or is lower than the received signal power strength of the signals transferred by another base station BS or another wireless telecommunication device HBS.

If a hand-over has to be performed for the mobile terminal MT, the processor 200 moves to step S403. Otherwise, the processor 200 returns to step S401.

At step S403, the processor 200 identifies the PCID transferred by the target wireless telecommunication device HBS which identifies the cell of the target wireless telecommunication device HBS. The processor 200 checks if the identified PCID is a PCID identifying cells of plural wireless telecommunication devices transferred by plural wireless telecommunication devices HBS.

For that, the processor 200 may consult a database comprising PCIDs identifying cells of plural wireless telecommunication devices and transferred by plural wireless telecommunication devices within a given area or a table describing the PCID of neighbouring cells. The database comprising PCIDs is stored in the RAM memory 203 or in the access gateway AGW or in a core network device of the wireless cellular telecommunication network.

If the identified PCID is a PCID identifying cells of plural wireless telecommunication devices transferred by plural wireless telecommunication devices HBS, the processor 200 moves to step S404. Otherwise, the processor 200 moves to step S407.

For example, the identified PCID is the PCID identifying cells of plural wireless telecommunication devices HBS transferred by the wireless telecommunication devices HBS1a, HBS1b and HBS1c.

At step S404, the processor 200 searches in the fingerprint table each fingerprint which contains the identified PCID. The processor 200 forms a list of wireless telecommunication devices which transfer the identified PCID.

At step S405, the processor 200, if needed, modifies the fingerprints comprised in the fingerprint table to take into account information it has about wireless devices included in the fingerprint. For example, if the processor 200 knows the transmit power used by wireless telecommunication devices, it re-evaluates the signal power values included in the fingerprints accordingly. For example, if the processor 200 is aware that a given wireless device is currently switched off, it re-evaluates the fingerprints by removing corresponding PCIDs in the fingerprints. Preferably, the processor 200 does not modify the fingerprints comprised in the fingerprint table as these modifications are temporary.

At next step S406, the processor 200 uses the at least one measurement report received at step S401 to build a key in order to search in the fingerprint table or with the modified fingerprints each fingerprint which may correspond to the key.

At that step, the processor 200 removes from the list of wireless telecommunication devices which transfer the identified PCID each wireless telecommunication device of which the fingerprint does not correspond to the key.

According to the above mentioned example, the processor 200 finds the fingerprint which corresponds to the location LocA and which identifies the wireless telecommunication device HBS1a. Only the wireless telecommunication device HBS1a remains in the list of wireless telecommunication devices which transfer the identified PCID.

At next step S407, the processor 200 prepares a hand-over of the mobile terminal MT to the wireless telecommunication device HBS1a.

At next step S408, the processor 200 checks if the hand-over of the mobile terminal MT is successfully completed.

If the hand-over of the mobile terminal MT is successfully completed, the processor 200 moves to step S411. Otherwise, the processor 200 moves to step S409.

At step S409, the processor 200 decreases the likelihood value which is associated with the selected fingerprint.

At next step S410, the processor 200 updates, if necessary, the fingerprint table. For example, if the likelihood value is low, the processor 200 removes the selected fingerprint from the fingerprint table.

After that, the processor 200 returns to step S401.

At step S411, the processor 200 increases the likelihood value which is associated with the selected fingerprint.

At next step S412, the processor 200 updates, if necessary, the fingerprint table. For example, if the fingerprint formed from the at least one measurement report has some differences with the selected fingerprint, a fingerprint formed from the at least one measurement report is inserted in place of the selected fingerprint in the fingerprint table. For example, if the fingerprint table is empty or no fingerprints were found, a fingerprint formed from the at least one measurement report is inserted in the fingerprint table.

After that, the processor 200 returns to step S401.

FIG. 5 discloses an example of an algorithm executed by a wireless telecommunication device or an access gateway according to a second mode of realisation of the present invention.

For example, the present algorithm will be disclosed when it is executed by the processor 200 of the base station BS1 which is currently serving the mobile terminal MT.

At step S500, the processor 200 creates a fingerprint table in the RAM memory 203 as disclosed at step S400 of FIG. 4.

At step S501, the processor 200 detects the reception, through the network interface 206, of at least one measurement report of measures executed by at least one mobile terminal MT and/or by the base station BS1.

When the present algorithm is executed by the access gateway AGW, the at least one measurement report is received from the base station BS which serves the mobile terminal MT.

A measurement report is as disclosed at step S401 of FIG. 4.

At step S502, the processor 200 checks if a hand-over has to be performed for the mobile terminal MT.

If a hand-over has to be performed for the mobile terminal MT, the processor 200 moves to step S503. Otherwise, the processor 200 returns to step S501.

At step S503, the processor 200 identifies the PCID transferred by the target wireless telecommunication device HBS which identifies the cell of the target wireless telecommunication device HBS. The processor 200 checks if the identified PCID is a PCID identifying cells of plural wireless telecommunication devices transferred by plural wireless telecommunication devices HBS.

For that, the processor 200 may consult a database comprising PCIDs identifying cells of plural wireless telecommunication devices and transferred by plural wireless telecommunication devices within a given area or a table describing the PCID of neighbouring cells. The database comprising PCIDs is stored in the RAM memory 203 or in the access gateway AGW or in a core network device of the wireless cellular telecommunication network.

If the identified PCID is a PCID identifying cells of plural wireless telecommunication devices transferred by plural wireless telecommunication devices HBS, the processor 200 moves to step S504. Otherwise, the processor 200 moves to step S509.

At step S504, the processor 200 searches in the fingerprint table each fingerprint which contains the identified PCID. The processor 200 forms a list of wireless telecommunication devices which transfer the identified PCID.

At step S505, the processor 200, if needed, modifies the fingerprints comprised in the fingerprint table to take into account information it has about wireless devices included in the fingerprint. For example, if the processor 200 knows the transmit power used by wireless telecommunication devices, it re-evaluates the signal power values included in the fingerprints accordingly. For example, if the processor 200 is aware that a given wireless device is currently switched off, it re-evaluates the fingerprints by removing corresponding PCIDs in the fingerprints. Preferably, the processor 200 does not modify the fingerprints comprised in the fingerprint table as these modifications are temporary.

At next step S506, the processor 200 uses the at least one measurement report received at step S501 to build a key in order to search in the fingerprint table or with the modified fingerprints, each fingerprint which may correspond to the key.

At that step, the processor 200 removes from the list of wireless telecommunication devices which transfer the identified PCID each wireless telecommunication device of which the fingerprint does not correspond to the key.

At next step S507, the processor 200 checks if a unique wireless telecommunication device HBS transferring the PCID remains in the list of wireless telecommunication devices as target wireless telecommunication device HBS as a result of the step S505.

If a unique wireless telecommunication device HBS transferring the PCID remains in the list of wireless telecommunication devices, there is no need to further get from the mobile terminal MT the CGI of the target cell at step S508, thus saving time. The processor 200 moves to step S509.

If plural or no wireless telecommunication devices HBS transferring the same PCID remain in the list of wireless telecommunication devices, the processor 200 moves to step S508.

At step S508, the processor 200 obtains the Global Cell Identifier (GCI) of the wireless telecommunication device HBS transferring the PCID transferred by plural wireless telecommunication devices HBS.

For that, the processor 200 commands the transfer of a message to the mobile terminal MT which sent the measurement report requesting the mobile terminal MT to read the Global Cell Global Identifier (CGI) of the wireless telecommunication device HBS transferring the PCID transferred by plural wireless telecommunication devices HBS. The CGI uniquely identifies a wireless telecommunication device HBS in the wireless cellular telecommunication network.

Thanks to the CGI, the processor 200 is able to identify only one wireless telecommunication device HBS.

At next step S509, the processor 200 prepares a hand-over of the mobile terminal MT to the wireless telecommunication device HBS identified in the list of wireless telecommunication devices or identified thanks to the CGI.

At next step S510, the processor 200 checks if the hand-over of the mobile terminal MT is successfully completed.

If the hand-over of the mobile terminal MT is successfully completed, the processor 200 moves to step S513. Otherwise, the processor 200 moves to step S511.

At step S511, the processor 200 decreases the likelihood value which is associated with the selected fingerprint.

At next step S512, the processor 200 updates, if necessary, the fingerprint table. For example, if the likelihood value is low, the processor 200 removes the selected fingerprint from the fingerprint table.

After that, the processor 200 returns to step S501.

At step S513, the processor 200 increases the likelihood value which is associated with the selected fingerprint.

At next step S514, the processor 200 updates, if necessary, the fingerprint table. For example, if the fingerprint formed from the at least one measurement report has some differences with the selected fingerprint, or if multiple fingerprints were found at step S507, a fingerprint formed from the at least one measurement report is inserted in place of the selected fingerprint in the fingerprint table. For example, if the fingerprint table is empty or no fingerprints were found, a fingerprint formed from the at least one measurement report is inserted in the fingerprint table.

After that, the processor 200 returns to step S501.

Naturally, many modifications can be made to the embodiments of the invention described above without departing from the scope of the present invention.

The invention claimed is:

1. A method for determining, in a wireless cellular telecommunication network, a wireless telecommunication device to which a hand-over of a mobile terminal has to be conducted, wherein plural wireless cellular telecommunication devices transfer a same physical cell identity to mobile terminals, the method comprising the steps of:
receiving at least one measurement report on signals measured by a mobile terminal;
determining, from the at least one measurement report, that a hand-over of the mobile terminal has to be conducted to a wireless telecommunication device which transfers the same physical cell identifier as the one transferred by at least another wireless telecommunication device;
obtaining a list specifying only wireless telecommunication devices which transfers the same physical cell identifier;
reducing, using a fingerprint table and the at least one measurement report, the list of wireless telecommunication devices which transfers the same physical cell identifier, by removing each wireless telecommunication device from the list that does not correspond to the at least one measurement report;
starting the hand-over of the mobile terminal to at least one wireless telecommunication device which belongs to the reduced list of wireless telecommunication devices; and
updating the fingerprint table depending on the result of the hand-over.

2. The method according to claim 1, wherein one fingerprint is a list of physical cell identifiers obtained from the at least one measurement report ordered or not according to the power strength of signals reported in the at least one measurement report or is a part of a set of physical cell identifiers obtained from the at least one measurement report.

3. The method according to claim 2, wherein one fingerprint is a combination of physical cell identifiers and associated data on which margin coefficients are applied.

4. The method according to claim 2, wherein each fingerprint includes a set of physical cell identifiers along with a time synchronisation difference relative to signals coming from the serving base station and/or along with signal noise plus interference ratio or along with a path loss and interference profile or along with a geo location information.

5. The method according to claim 2, wherein each fingerprint is an equation based on a set of physical cell identifiers.

6. The method according to claim 5, wherein each physical cell identifier in one fingerprint is associated with a weight depending on the type of wireless telecommunication device.

7. The method according to claim 2, wherein each physical cell identifier is associated with data relative to the wireless communication device obtained by a communication channel different than the measurement reported transferred by mobile terminals.

8. The method according to claim 1, wherein at least one fingerprint is associated to one wireless telecommunication device.

9. The method according to claim 1, wherein fingerprints are re-evaluated at the time of reducing the list of wireless telecommunication devices by taking into account updated information about wireless devices included in the fingerprints.

10. The method according to claim 1, wherein a likelihood value is associated with each fingerprint in the fingerprint table, if the hand-over to one wireless telecommunication device is unsuccessful, the method comprises further step of decreasing the reliability value of the likelihood value associated to the fingerprint associated to the wireless telecommunication device and if the hand-over to one wireless telecommunication device is successful, the method further comprising the step of:
increasing the reliability value of the likelihood value associated to the fingerprint associated to the wireless telecommunication device.

11. A device that determines, in a wireless cellular telecommunication network, a target wireless telecommunication device to which a hand-over of a mobile terminal has to be conducted, wherein plural wireless cellular telecommunication devices transfer a same physical cell identity to mobile terminals, the device comprising:
means for receiving at least one measurement report on signals measured by a mobile terminal;
means for determining, from the at least one measurement report that a hand-over of the mobile terminal has to be conducted to a wireless telecommunication device which transfers the same physical cell identifier as the one transferred by at least another wireless telecommunication device;
means for obtaining a list specifying only wireless telecommunication devices which transfers the same physical cell identifier;
means for reducing, using a fingerprint table and the at least one measurement report, the list of wireless telecommunication devices which transfers the same physical cell identifier, by removing each wireless telecommunication device from the list that does not correspond to the at least one measurement report;
means for starting the hand-over of the mobile terminal to at least one wireless telecommunication device which belongs to the reduced list of wireless telecommunication devices; and
means for updating the fingerprint table depending on the result of the hand-over.

12. The device according to claim 11, wherein the device that determines the target wireless telecommunication device is included in a base station or an access gateway of the wireless cellular telecommunication network.

13. A non-transitory computer readable storage medium having executable instructions stored therein, which when executed by a processor in a network programmable device causes the processor to execute a method for determining, in a wireless cellular telecommunication network, a wireless telecommunication device to which a hand-over of a mobile terminal has to be conducted, wherein plural wireless cellular telecommunication devices transfer a same physical cell identity to mobile terminals, the method comprising the steps of:
receiving at least one measurement report on signals measured by a mobile terminal;
determining, from the at least one measurement report, that a hand-over of the mobile terminal has to be conducted to a wireless telecommunication device which transfers the same physical cell identifier as the one transferred by at least another wireless telecommunication device;
obtaining a list specifying only wireless telecommunication devices which transfers the same physical cell identifier;
reducing, using a fingerprint table and the at least one measurement report, the list of wireless telecommunication devices which transfers the same physical cell identifier, by removing each wireless telecommunication device from the list that does not correspond to the at least one measurement report;

starting the hand-over of the mobile terminal to at least one wireless telecommunication device which belongs to the reduced list of wireless telecommunication devices; and updating the fingerprint table depending on the result of the hand-over.

* * * * *